United States Patent
Chen et al.

(10) Patent No.: US 11,052,513 B2
(45) Date of Patent: Jul. 6, 2021

(54) PNEUMATIC-FIXATION CONNECTING DEVICE

(71) Applicant: KING YUAN FU PACKAGING CO., LTD., New Taipei (TW)

(72) Inventors: Yu-Hui Chen, New Taipei (TW); Yung-Chun Chang, New Taipei (TW)

(73) Assignee: KING YUAN FU PACKAGING CO., LTD., New Taipei (TW)

( * ) Notice: Subject to any disclaimer, the term of this patent is extended or adjusted under 35 U.S.C. 154(b) by 267 days.

(21) Appl. No.: 16/400,037

(22) Filed: May 1, 2019

(65) Prior Publication Data
US 2020/0114492 A1    Apr. 16, 2020

(30) Foreign Application Priority Data

Oct. 12, 2018   (TW) .................................. 107213806

(51) Int. Cl.
*H01L 21/68* (2006.01)
*B25B 5/06* (2006.01)

(52) U.S. Cl.
CPC ................... *B25B 5/064* (2013.01)

(58) Field of Classification Search
CPC ....... B25B 11/00; B25B 11/005; B25B 5/064; B25B 5/00; H01L 21/6838
See application file for complete search history.

(56) References Cited

U.S. PATENT DOCUMENTS

| | | | | |
|---|---|---|---|---|
| 2010/0308524 A1* | 12/2010 | Kitaura | ................ | B23Q 1/0081 269/309 |
| 2015/0054211 A1* | 2/2015 | Hediger | ............... | B23Q 1/0072 269/309 |
| 2020/0114492 A1* | 4/2020 | Chen | .................... | B23K 1/0006 |

* cited by examiner

*Primary Examiner* — Lee D Wilson
(74) *Attorney, Agent, or Firm* — Chun-Ming Shih; HDLS IPR Services

(57) ABSTRACT

A pneumatic-fixation connecting having a body, a movable part, a plurality of spheres, a plurality of elastic units, and a plurality of stop units is disclosed, wherein each of the elastic units is disposed between the body and the movable part via each of the stop units, respectively. When an external force is applied on the movable part, the distance between the movable part and the body is reduced and the sphere does not block the connecting pin in the extension tube inside the body. When the external force disappears, the distance between the movable part and the body increases such that the sphere affixes the connecting pin and the body. The stop unit can be used, not only to adjust the length and elastic force of the elastic unit so as to extend the life cycle of the elastic unit, but also to help in changing the elastic unit which in turn enhances the efficiency of the replacement work.

11 Claims, 8 Drawing Sheets

PNEUMATIC-FIXATION CONNECTING DEVICE

REFERENCE TO RELATED APPLICATIONS

This non-provisional application claims priority under 35 U.S.C. § 119(a) on Taiwan Patent Application No. 1072133806 filed Oct. 12, 2018, the entire contents of which are incorporated herein by reference.

FIELD OF THE INVENTION

The invention relates to a pneumatic-fixation connecting device, more particularly, to a pneumatic-fixation connecting device that uses stop units to adjust length and elastic force of elastic units and to change the elastic units, thereby enhancing the life cycle and maintenance convenience of the pneumatic-fixation connecting device.

BACKGROUND

In industrial processing factory and manufacturing, two devices are often required to be temporarily connected for processing or manufacturing purposes. When the processing is complete, the two devices need to be separated for the next process.

In general, a number of screws are used to affix two different devices and the screws are removed after the processing is complete. However, installing and removing screws would take up a lot of time, especially when the connection between the two devices required a better stability, more screws are needed to achieve the stability standard. Hence, more time is spent on changing and connecting two devices and in turn the manufacturing time and cost are increased.

SUMMARY

The invention provides a pneumatic-fixation connecting device, which includes a body, a movable part, and a plurality of elastic units disposed between the body and the movable part. When using the device, the distance between the movable part and the body can be adjusted by changing air pressure, which forces a sphere between the body and the movable part to affix or release a connecting pin, and thereby quickly connecting and changing two different devices.

The invention provides a pneumatic-fixation connecting device, in which a plurality of elastic units are disposed between a body and a movable part through a plurality of stop units. When the elastic unit is worn, its length and elastic force can be adjusted through the stop unit so as to extend its life cycle. Moreover, when the elastic unit is not usable anymore, it can be removed and replaced by a new elastic unit by disassembling the stop unit from the body, and thereby enhancing convenience in repairing the pneumatic-fixation connecting device.

The present invention provides a pneumatic-fixation connecting device, which includes a connecting pin, a body, a movable part, a plurality of elastic units, a plurality of stop units, and a plurality of spheres. The connecting pin includes a protruding unit located at one end of the connecting pin. The body includes an extension tube and a plurality of placement holes disposed at a periphery of the extension tube, wherein the extension tube includes a plurality of through holes located thereon and a connecting hole for accommodating the connecting pin. The movable part is stacked and overlaps the body and is movable relative to the body. The movable part includes a base and a protrusion ring disposed on a surface of the base, wherein an inner surface of the protrusion ring forms a coupling hole for accommodating the extension tube, and at least one protruding portion is disposed on the inner surface of the protrusion ring. The plurality of elastic units are respectively disposed in the plurality of placement holes of the body, and one end of the elastic unit is in contact with the base of the movable part. The plurality of stop units are respectively disposed in the plurality of placement holes of the body, and the stop unit is in contact with the other end of the elastic unit. The length of the elastic unit is adjusted by the stop unit. The plurality of spheres are disposed between the protrusion ring and the extension tube. When the distance between the movable part and the body increases, the protruding portion of the protrusion ring pushes the sphere and forces a partial volume of the sphere to enter the connecting hole via the through hole of the extension tube, and thereby affixing the protruding unit of the connecting pin. When the distance between the movable part and the body decreases, the sphere does not affix the protruding unit of the connecting pin.

In one embodiment of the invention, the surface of the base that connects to the protrusion ring includes a plurality of indentations for respectively accommodating the elastic units.

In one embodiment of the invention, the connecting pin includes at least one recess portion, wherein the partial volume of the sphere enters the recess portion of the connecting pin via the through hole of the extension tube.

In one embodiment of the invention, the diameter of the through ole of the extension tube is smaller than the diameter of the sphere.

In one embodiment of the invention, the protrusion ring further includes at least one cavity for accommodating the spheres.

In one embodiment of the invention, a notch for accommodating the protrusion ring is disposed on a surface of the body that faces the movable part.

In one embodiment of the invention, a screw thread is disposed in the placement hole of the body and a corresponding screw thread is disposed in the respective stop unit, wherein the stop unit is disposed on the through hole via the screw thread and adjusts the length of the elastic unit by the screw thread.

In one embodiment of the invention, the stop unit can be separated from the placement hole of the body and the elastic unit can be taken out from the placement hole.

In one embodiment of the invention, the device further includes a pump and an air-pressure chamber, wherein the pump is fluidly connected to the air-pressure chamber and can change the pressure therein, and the movable part is placed in the air-pressure chamber and movable along an inner surface of the air-pressure chamber.

In one embodiment of the invention, the pump is used to increase the pressure of the air-pressure chamber, and when the pressure force in the air-pressure chamber is greater than the elastic force of the elastic unit, the movable part moves towards the direction of the body and thereby reducing the distance between the movable part and the body.

In one embodiment of the invention, the extension tube protrudes from the body and the plurality of through holes are disposed on the extension tube that protrudes out of the body.

BRIEF DESCRIPTION OF THE DRAWINGS

The structure as well as preferred modes of use, further objects, and advantages of this invention will be best understood by referring to the following detailed description of some illustrative embodiments in conjunction with the accompanying drawings, in which.

DETAILED DESCRIPTION OF THE PREFERRED EMBODIMENTS

Figure 1:
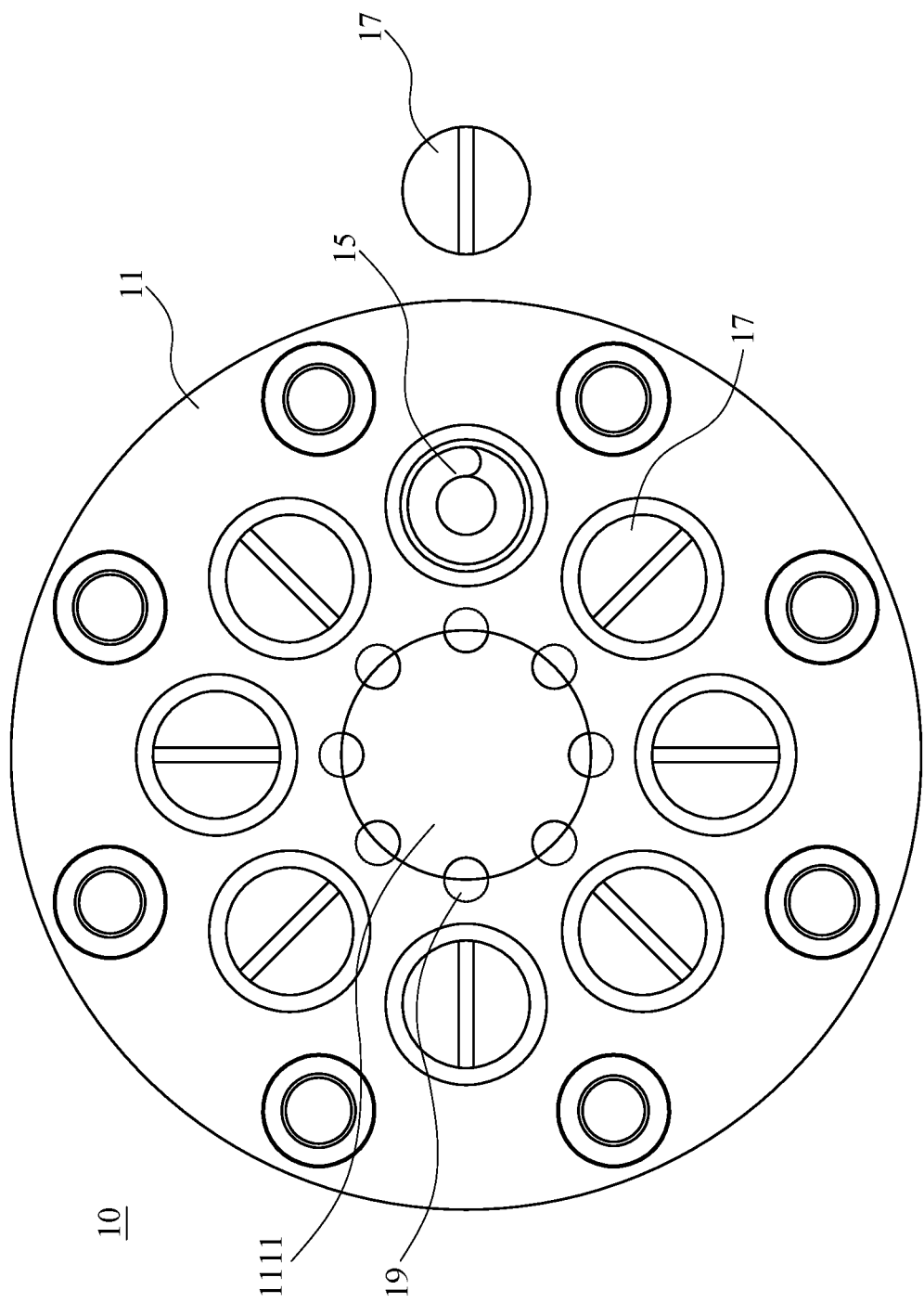
FIG. 1 is a top view of an exploded schematic diagram illustrating a pneumatic-fixation connecting device according to an embodiment of the invention.
Figure 2:
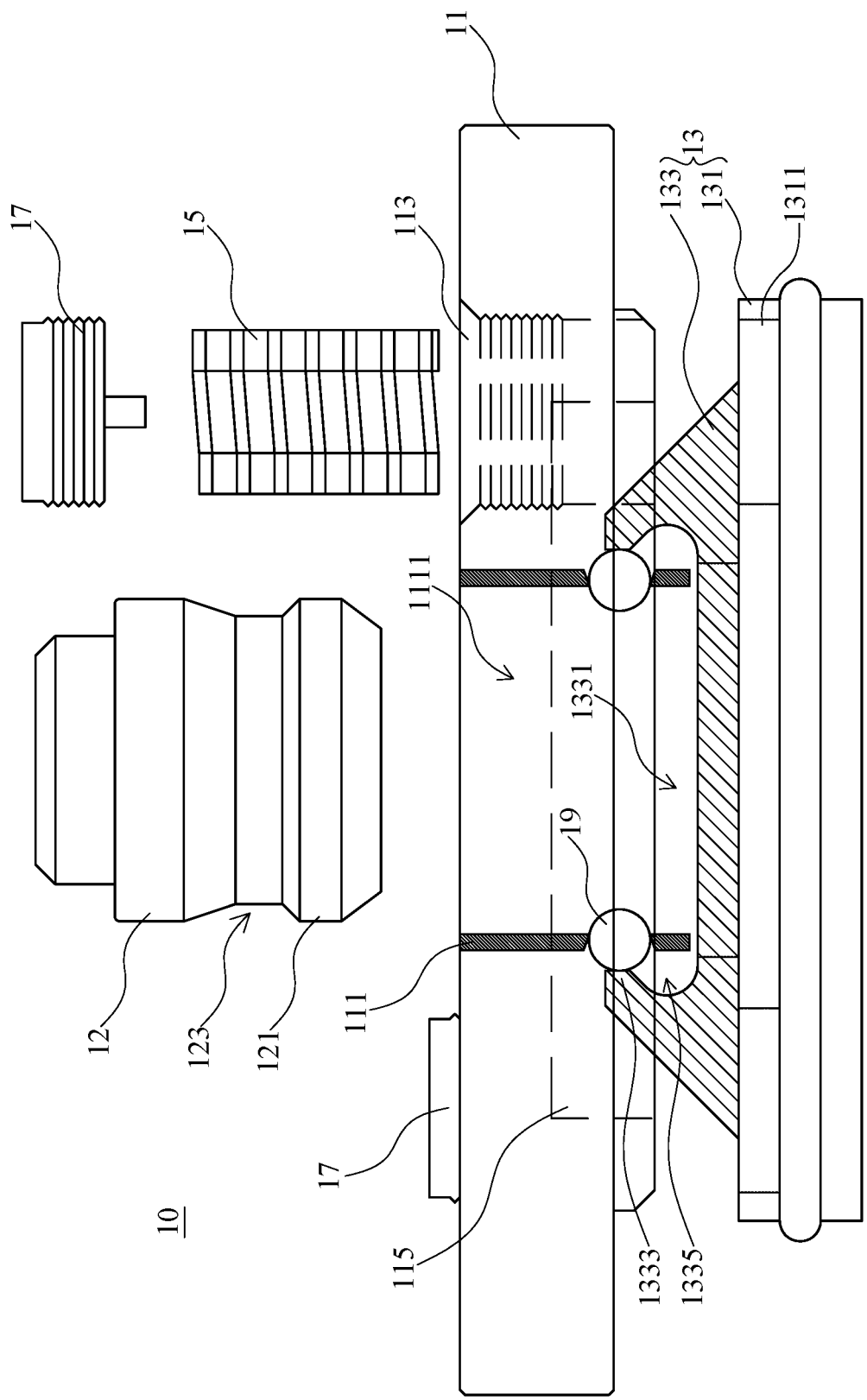
FIG. 2 is a side view of an exploded schematic diagram illustrating a pneumatic-fixation connecting device according to an embodiment of the invention.
Figure 3:
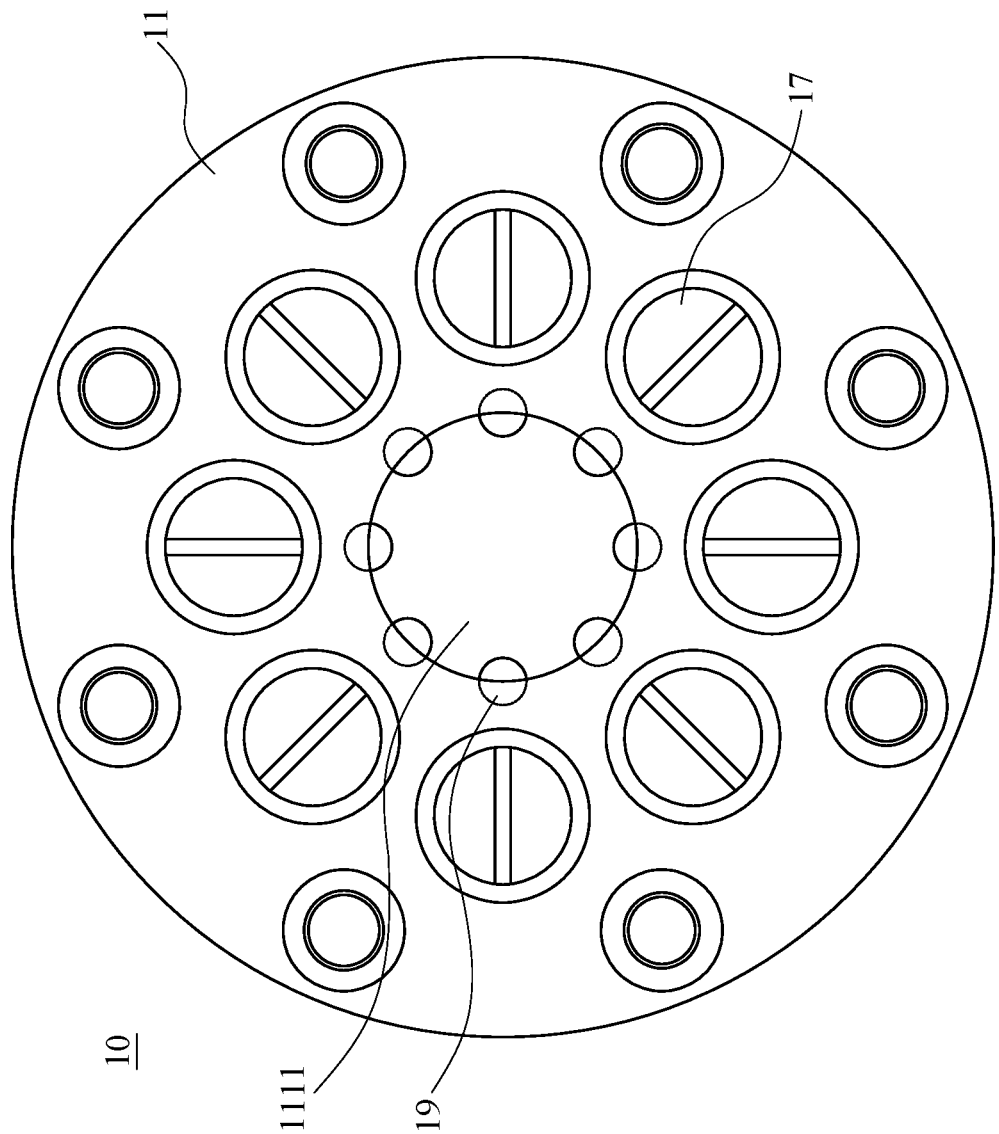
FIG. 3 is a top view of a pneumatic-fixation connecting device according to an embodiment of the invention.

FIGS. 1 to 4 are, respectively, top view and side view of an exploded schematic diagram of a pneumatic-fixation connecting device and top view and side view of a pneumatic-fixation connecting device according to a preferred embodiment of the invention. The pneumatic-fixation connecting device 10 includes a body 11, a movable part 13, a plurality of elastic units 15, a plurality of stop units 17, and a plurality of spheres 19, wherein the elastic unit 15 is disposed between the body 11 and the movable part 13, and the movable part 13 can compress the elastic unit 15 and move relative to the body 11.

The body 11 includes an extension tube 111 and a plurality of placement holes 113, wherein the placement holes 113 are disposed around the extension tube 111, for example, an axial direction of the placement holes 113 is parallel to an axial direction of the extension tube 111. In an embodiment of the invention, the body 11 is a disc or a cylinder, and has a center hole at its center position. The body 11 and the extension tube 111 can be two components, wherein a part of the extension tube 111 is disposed in the center hole of the body 11 such that the part of the extension tube 111 protrudes out of the body 11, and the plurality of placements holes 113 are disposed as such to surround the center hole and the extension tube 111. In another embodiment of the invention, the body 11 and the extension tube 111 can be a single integrated component.

Figure 4:
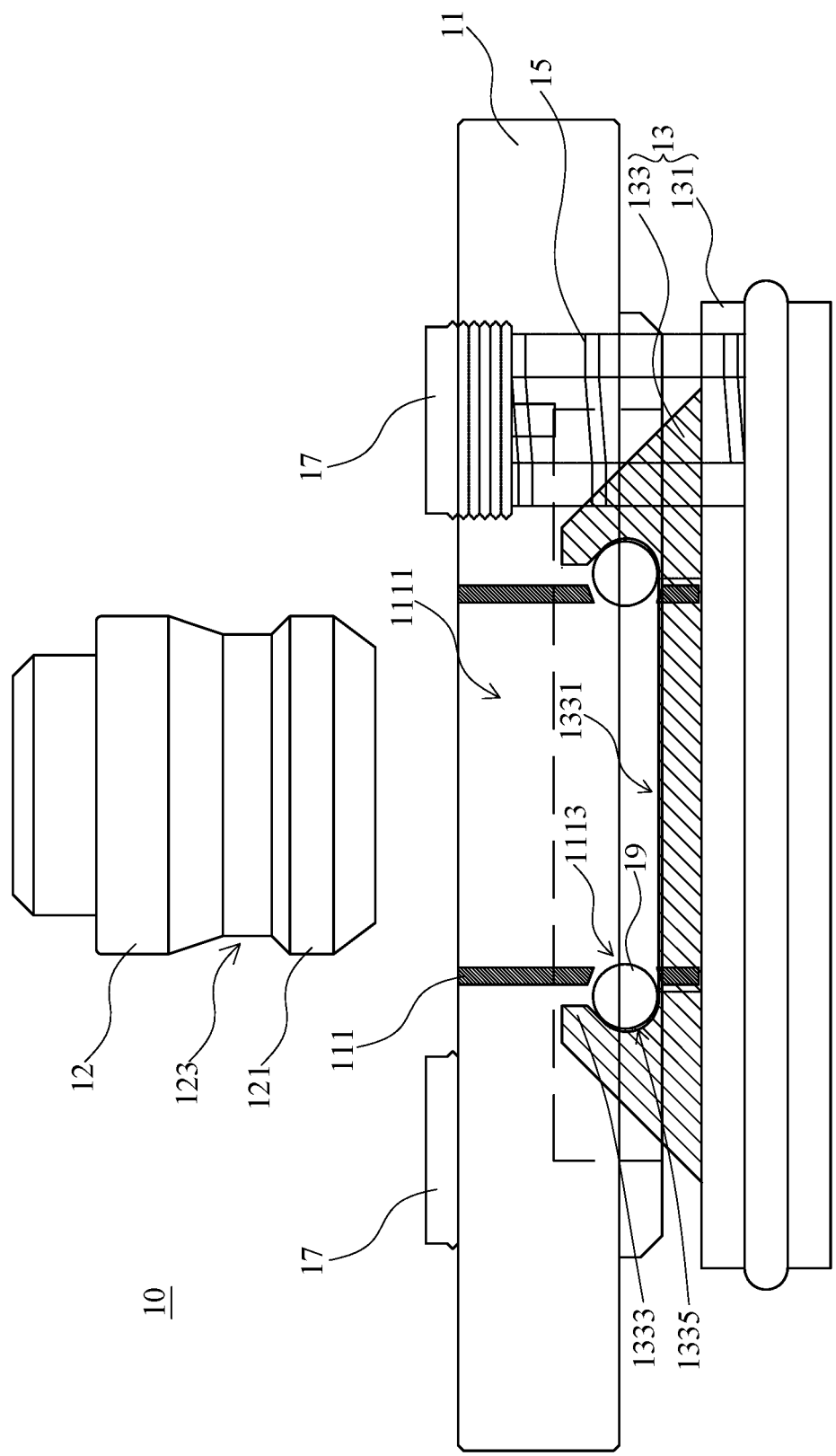
FIG. 4 is a side view of a pneumatic-fixation connecting device according to an embodiment of the invention.

The extension tube 111 includes a connecting hole 1111 and a plurality of through holes 1113. As shown in FIG. 4, the extension tube 111 can be a circular pipe and the connecting hole 1111 is the accommodating space formed in the extension tube 111 for accommodating a connecting pin. The plurality of through holes 1113 are disposed on a surface of the extension tube 111 and penetrate through the extension tube 111. In one embodiment of the invention, the plurality of through holes 1113 on the extension tube 111 are disposed at the same horizontal height/level.

In particular, a part of the extension tube 111 protrudes from the body 11, for instance, protrude towards the direction where the movable part 13 is disposed, and the through holes 1113 are disposed on the part of the extension tube 111 that is protruded from the body 11.

The movable part 13 is disposed in a stacked manner with the body 11 and includes a base 131 and a protrusion ring 133, wherein the base 131 is a disc or a cylinder and is disposed to overlap the body 11. The protrusion ring 133 is disposed on a surface of the base 131, like on the surface of the base 131 facing the body 11, such that the protrusion ring 133 is positioned between the base 131 and the body 11. The base 131 and the protrusion ring 133 can be a single integrated component or two separate components.

The protrusion ring 133 can be annular, wherein an inner surface of the protrusion ring 133 forms a coupling hole 1331 for accommodating part of the extension tube 111 and/or the connecting pin 12. Moreover, the inner surface of the protrusion ring 133 has disposed thereon at least one protruding portion 1333, wherein the protruding portion 1333 is positioned on the inner surface of the protrusion ring 133 and near the body 11.

In one embodiment of the invention, the inner surface of the protrusion ring 133 can also be disposed with at least one cavity 1335, wherein the cavity 1335 is positioned between the protruding portion 1333 and the base 131 for accommodating the sphere 19. Moreover, the number of cavity 1335 can be one and is the annular cavity disposed at the inner surface of the protrusion ring 133. In another embodiment of the invention, the number of cavity 1335 can be plural and are semi-sphere or arc cavities disposed at the inner surface of the protrusion ring 133.

The movable part 13 can move relative to the body 11 and therefore change the distance between the two. In one embodiment of the invention, a surface of the body 11 facing the movable part 13 has a notch 115 disposed thereon. Part of the protrusion ring 133 can be positioned in the notch 115 and part of the extension tube 111 of the body 11 is positioned in a coupling hole 1331 of the protrusion ring 133.

The plurality of elastic units 15 are disposed respectively in the plurality of placement holes 113 of the body 11, wherein one end of the elastic unit 15 touches the movable part 13, such as being in contact with the base 131 of the movable part 13.

In one embodiment of the invention, the base 131 of the movable part 13 has a plurality of indentations 1311 disposed thereon, wherein the number of indentations is the same as the number of placement holes 113 of the body 11. The indentations 1311 can, for example, be disposed on the surface of the 131 where the protrusion ring 133 is disposed. When the movable part 13 overlaps with the body 11, the indentations 1311 of the movable part 13 overlap with the placement holes 113 of the body 11.

Thus, when disposing the elastic unit 15 in each placement hole 113 of the body 11, part of the elastic unit 15 is positioned in the indentation 1311 of the movable part 13 and comes in contact with the base 131 of the movable part 13. By disposing indentations 1311 on the base 131 of the movable part 13, the position of the elastic unit 15 can be limited to prevent the displacement or slide of the elastic unit 15 relative to the movable part 13.

The plurality of stop units 17 are disposed respectively in each of the placement holes 113 of the body 11. When the stop unit 17 is placed in the placement hole 113 of the body 11, the other end of the elastic unit 15 comes in contact with the stop unit 17. The placement hole 113 of the body 11 can be, for example, a cylindrical space, and a partial region of the stop unit 17 can be cylindrical so as to be fixed in the placement hole 113.

In one embodiment of the invention, screw threads are placed at the inner surface of the placement hole 113 of the body 11, and corresponding screw threads are placed on a part of the outer surface of the stop unit 17, so that the stop unit 17 can be fixed to the placement hole 113 of the body 11 via screw threads.

The plurality of spheres 19 are positioned between the protrusion ring 133 of the movable part 13 and the extension tube 111 of the body 11. For example, the sphere 19 is disposed in the cavity 1335 of the protrusion ring 133 and/or in the through hole 1113 of the extension tube 111. When no external force is applied onto the movable part 13 and/or the body 11, the elastic unit 15 causes the distance between the movable part 14 and the body 11 to increase. At this time, the protruding portion 1333 on the inner surface of the protrusion ring 133 is pushing the sphere 19 to enter the through hole 1113 of the extension tube 111, wherein a partial volume of the sphere 19 gets into the connecting hole 1111 of the extension tube 111 through the through hole 1113 and protrudes from the inner surface of the extension tube 111.

In specific, the diameter of the through hole 1113 of the extension tube 111 is smaller than the diameter of the sphere 19, and so when the sphere 19 is being pushed by the protruding portion 1333 of the protrusion ring 133, the sphere 19 does not pass through the through hole 1113.

On the contrary, when there is an external force existing between the body 11 and the movable part 13 and the external force is greater than the elastic force of the elastic unit 15, the movable part 13 moves towards the direction of the body 11 and so the distance between the body 11 and the movable part 13 is decreased. At this time, the protruding portion 1333 at the inner surface of the protrusion ring 133 would not push the sphere 19 and so the sphere 19 falls below the protruding portion 1333 and into the cavity 1335 at the inner surface of the protrusion ring 133. Thereafter, the sphere 19 would not get into the connecting hole 1111 of the extension tube 111 through the through hole 1113 and would not protrude out of the inner surface of the extension tube 111.

A connecting pin 12 can be inserted into the extension tube 111 of the body 11 and the coupling hole 1331 of the protrusion ring 133, and can be fixed on the body 11 and/or the movable part 13 through the sphere 19. The connecting pin 12 includes a protruding unit 121, wherein the protruding unit 121 is disposed at one end of the connecting pin 12. When part of the sphere 19 enters the connecting hole 1111 through the through hole 1113 of the extension tube 111, the protruding unit 121 of the connecting pin 12 is restricted or fixed between the sphere 19 and the movable part 13. On the other hand, when the sphere 19 leaves the connecting hole 1111 of the extension tube 111, the protruding unit 121 of the connecting pin 12 would not be restricted or fixed by the sphere 19, and therefore can be taken out from the connecting hole 1111. The detailed interaction would be described in the following embodiments.

In one embodiment of the invention, the connecting pin 12 also includes at least one recess portion 123, wherein the recess portion 123 is adjacent to the protruding unit 121, and the sphere 19 is able to get into the recess portion 123 of the connecting pin 12 through the through hole 1113 of the extension tube 111. The recess portion 123 can be disposed above the protruding unit 121.

As described above, the connecting force between the connecting pint 12 and the body 11 and/or the movable part 13 is provided by the elastic unit 15 between the body 11 and the movable part 13. When the pulling force between the connecting pin 12 and the body 11 is greater than the elastic force of the elastic unit 15, the connecting pin 12 may be separated from the body 11.

More specifically, when the elastic unit 15 is worn out and its elastic force is diminishing, replacement of the elastic unit 15 is usually needed. When changing the elastic unit 15, the conventional way is to disassemble the pneumatic-fixation connecting device 10, separate the body 11 and the movable part 13, take out the elastic unit 15 located between the two, and replace with a new elastic unit 15. In doing so, the maintenance cost and required repair time for the pneumatic-fixation connecting device 10 is increased.

By disposing the plurality of placement holes 113 on the body 11 and disposing the stop units 17 at the placement holes 113, the invention is able to fix the elastic unit 15 between the body 11 and the movable part 13.

In practical application, in the situation when the elastic unit 15 is worn and its elastic force is diminishing, the user can adjust the length of the elastic unit 15 through the screw threads on the stop unit 17 and the placement hole 113 of the body 11 and thus the elastic unit 15 is compressed to enhance the elastic force generated by the elastic unit 15.

The user can screw some or all of the stop unit 17 tightly on the placement hole 113 so that the stop units 17 compress the elastic units 15 to increase the elastic force generated by the elastic units 15. Therefore, even when the elastic unit 15 is worn and has insufficient elastic force, the user can adjust the stop unit 17 to generate sufficient elastic force from the elastic unit 15, and thereby the elastic unit 15 can continue to be used, which in turn lowers the cost of using the pneumatic-fixation connecting device 10.

Moreover, when the elastic unit 15 is at the end of its life cycle, the user can easily disassemble the stop unit 17 from the body 11, take out the elastic unit 15 from the placement hole 113 of the body 11, and replace with a new elastic unit 15. After the replacement, the user just screws the stop unit 17 back into the placement hole 113 of the body 11 and, through the stop unit 17, adjust the elastic force generated by the new elastic unit 15.

Hence, the invention can extend the life cycle of the elastic unit 15 in the pneumatic-fixation connecting device, reduce the time spent on changing the elastic unit 15, and also adjust the elastic force generated by the elastic unit 15, thereby resulting in more usage convenience.

FIGS. 5-8 are respectively side views of a pneumatic-fixation connecting device according to another embodiment of the invention. The pneumatic-fixation connecting device 10 includes a body 11, a movable part 13, a plurality of elastic units 15, a plurality of stop units 17, a plurality of spheres 19, an air-pressure chamber 141, and a pump 143. The elastic unit 15 is disposed between the body 11 and the movable part 13, and the movable part 13 is disposed in the air-pressure chamber 141 and movable relative to the body 11.

Figure 5:
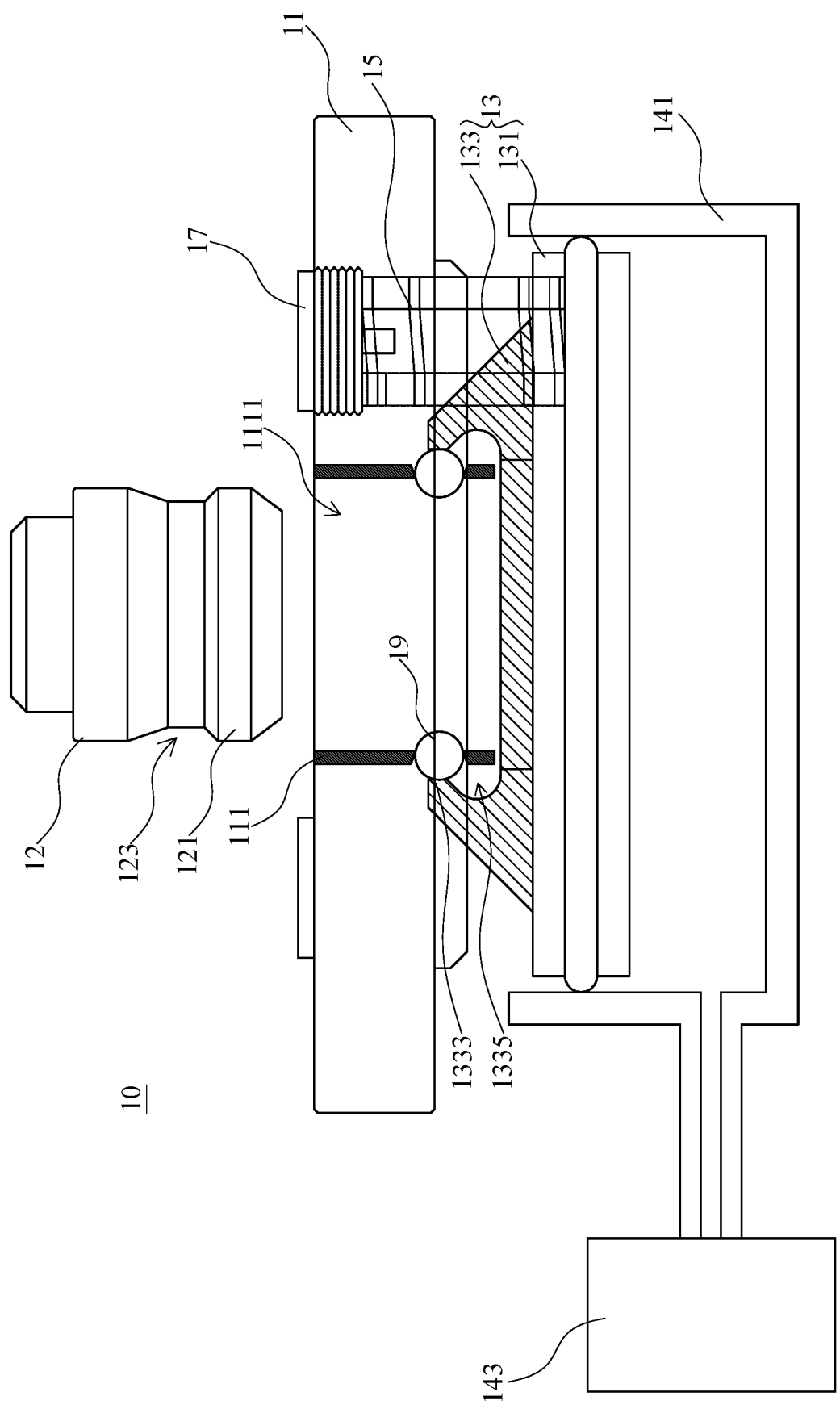
FIG. 5 is a side view of a pneumatic-fixation connecting device according to another embodiment of the invention.

In one embodiment of the invention, the base 131 of the movable part 13 is a piston, and the air-pressure chamber 141 has a pipe structure such that the movable part 13 can move along the inner surface of the air-pressure chamber 141. The pump 143 is fluidly connected to the air-pressure chamber 141 and is used to change the air pressure in the air-pressure chamber 141. When the pump 143 is inactive, no air is pumped to the air-pressure chamber 141 and so the air pressure in the air-pressure chamber 141 is usually the same as the air pressure in the outer world. At this time, the movable part 13 is affected by the elastic unit 15 and is away from the body 11, and the sphere 19 is pushed by the protruding portion 1333 of the protrusion ring 133, wherein the partial volume of each sphere 19 gets into the connecting hole 1111 of the extension tube 111 through each through hole 1113 as shown in FIG. 5.

Figure 6:
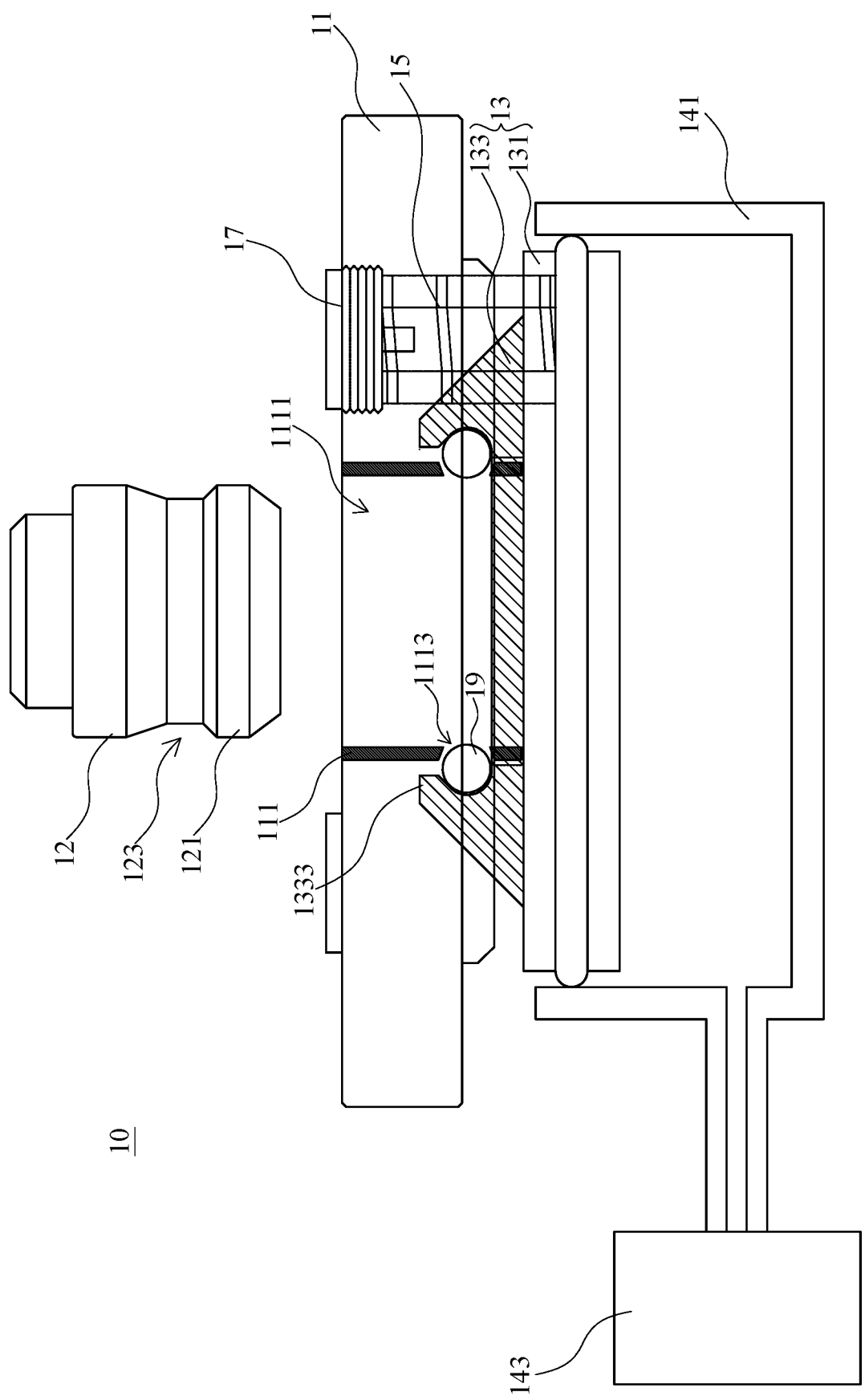
FIG. 6 is a side view of a pneumatic-fixation connecting device according to another embodiment of the invention.
Figure 7:
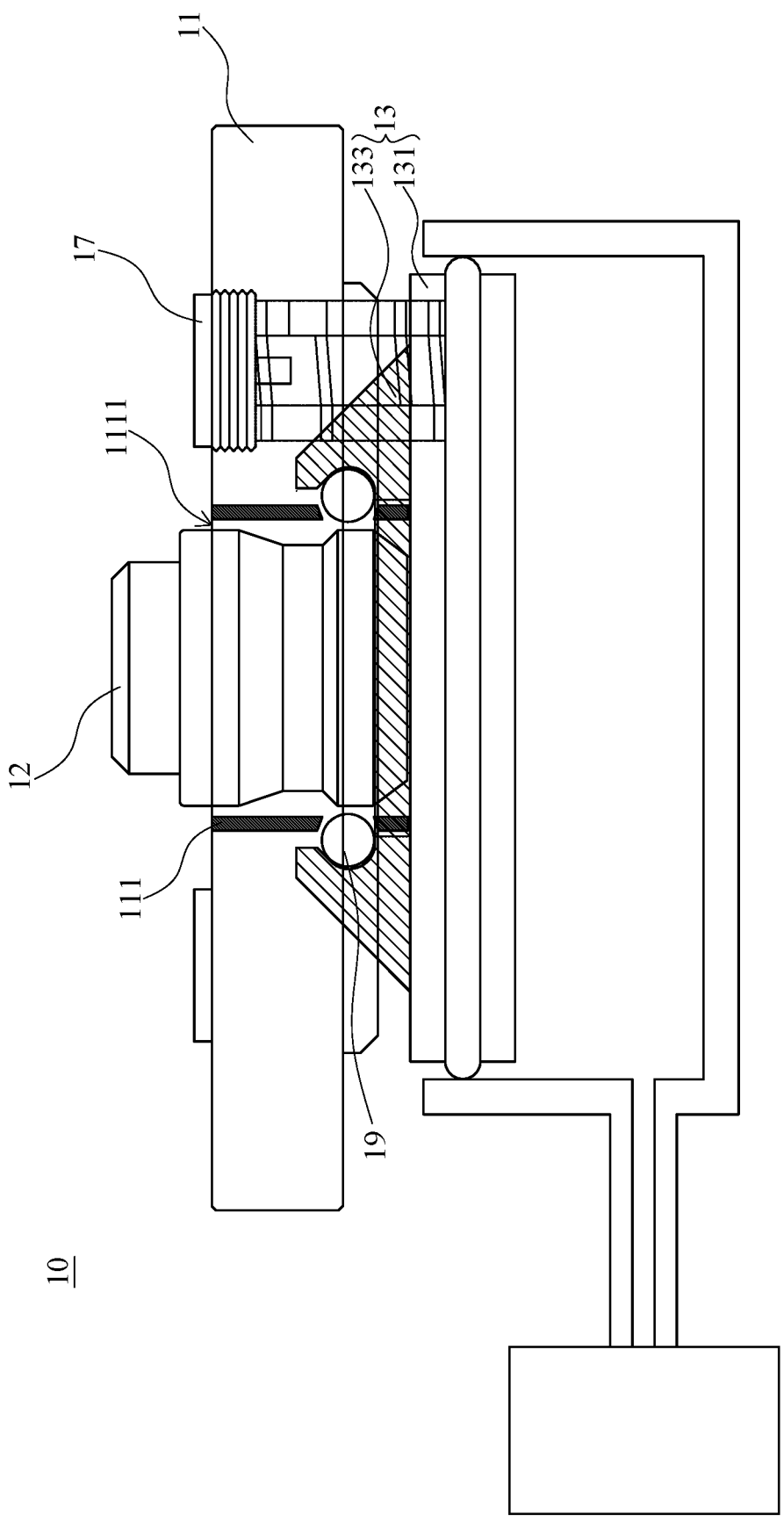
FIG. 7 is a side view of a pneumatic-fixation connecting device according to another embodiment of the invention.

The pump 143 is for pumping air into the air-pressure chamber 141 to increase the air pressure in the air-pressure chamber 141, wherein the air pressure would act on the base 131 of the movable part 13. When the pressure force in the air-pressure chamber 141 is greater than the elastic force of the elastic unit 15, the movable part 13 moves along the inner surface of the air-pressure chamber 141 towards the direction of the body 11, and thereby reducing the distance therebetween. The protruding portion 1333 of the protrusion ring 133 does not push the sphere 19 at this stage, and so each sphere 19 enters into the cavity 1335 at the inner surface of the protrusion ring 133 and would not get into the connecting hole 1111 of the extension tube 111 through each through hole 1113, as shown in FIG. 6. Since the sphere 19 is not in the connecting hole 1111 of the extension tube 111, the connecting pin 12 can be inserted into the extension tube 111 of the body 11 and the protrusion ring 133 of the movable part 13, as shown in FIG. 7.

Figure 8:
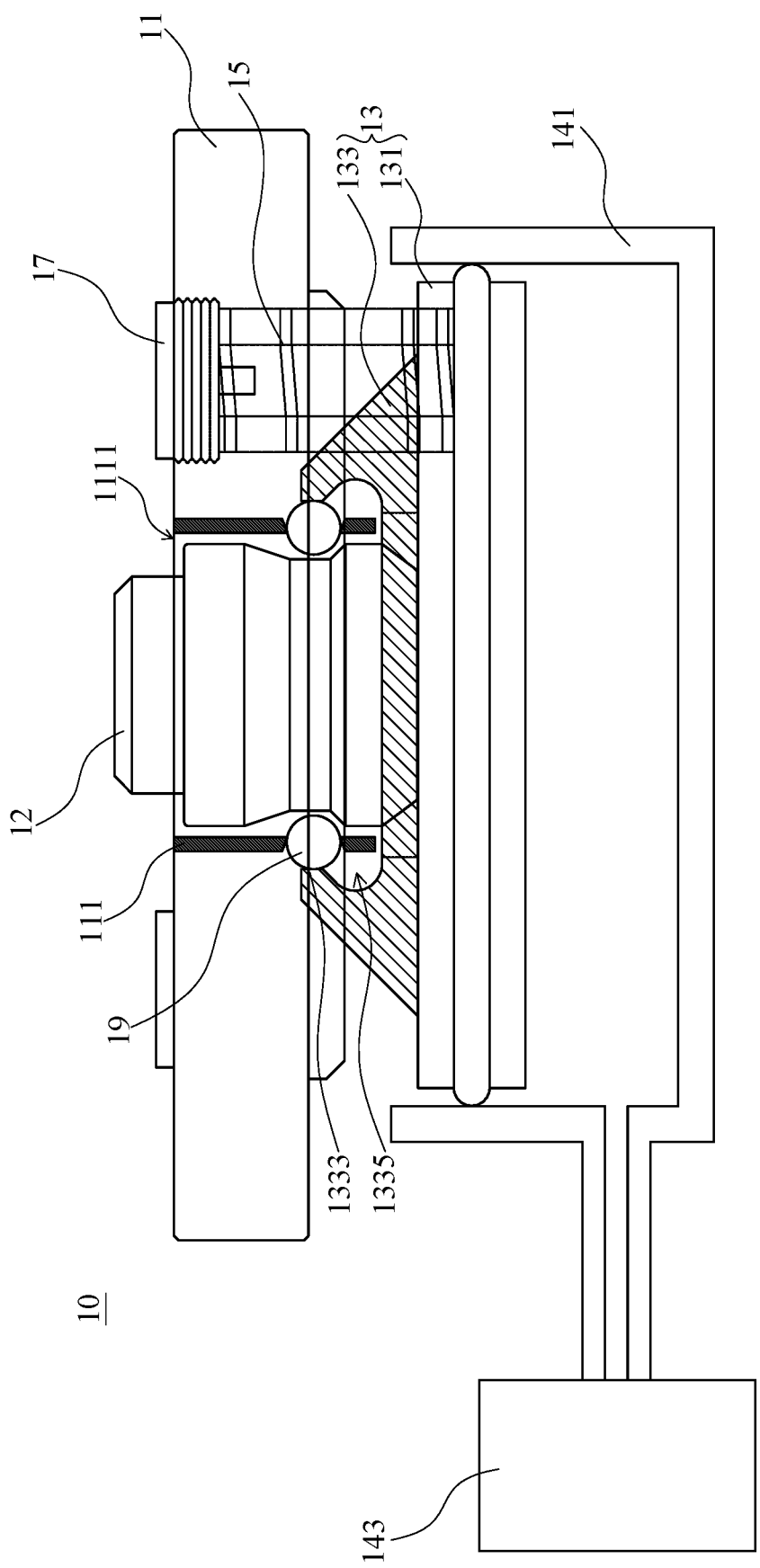
FIG. 8 is a side view of a pneumatic-fixation connecting device according to another embodiment of the invention.

The pump 143 can release the air in the air-pressure chamber 141 to lower the air pressure therein. When the pressure force in the air-pressure chamber 141 is smaller than the elastic force of the elastic unit 15, the movable part 13 is away from the body 11 and therefore the distance between the two is increased. The sphere 19 is now being pushed by the protruding portion 1333 of the protrusion ring 133, and the partial volume of each sphere 19 gets into the connecting hole 1111 of the extension tube 111 and the recess portion 123 of the connecting pin 12 through each through hole 1113. Referring to FIG. 8, the protruding unit 121 of the connecting pin 12 is thereby fixed by the sphere 19 and the connection between the connecting pin 12 and the body 11 is complete.

In practical application, the stop unit is adjusted based on the worn-out level of the elastic unit 15 so as to further compress the elastic unit 15 for increasing or maintaining the elastic force generated by the elastic unit 15 and the product life cycle. When the elastic unit 15 is no longer usable, the stop unit 17 can be disassembled from the body 11 and a new elastic unit 15 is replaced, which in turn enhances maintenance efficiency.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

The invention claimed is:

1. A pneumatic-fixation connecting device comprising:
   a connecting pin, comprising a protruding unit at one end of the connecting pin;
   a body, comprising an extension tube and a plurality of placement holes, wherein the plurality of placement holes are located at a periphery of the extension tube, wherein the extension tube comprises a connecting hole and a plurality of through holes, the connecting hole is used to accommodate the connecting pin, and the plurality of through holes are located on the extension tube;
   a movable part movably disposed in a stacking manner to the body for moving relative thereto, the movable part comprising a base and a protrusion ring, wherein the protrusion ring is located on a surface of the base, an inner surface of the protrusion ring forms a coupling hole for accommodating the extension tube, and the inner surface of the protrusion ring has at least one protruding portion thereon;
   a plurality of elastic units, disposed respectively in the plurality of placement holes of the body, and one end of each elastic unit being in contact with the base of the movable part;
   a plurality of stop units, disposed respectively in the plurality of placement holes of the base, wherein each stop unit is in contact with another end of the elastic unit; and
   a plurality of spheres, disposed between the protrusion ring and the extension tube, wherein when the distance between the movable part and the body increases, the protruding portion of the protrusion ring pushes the spheres to force a partial volume of the sphere enter the connecting hole via the through hole of the extension tube and affix the protruding unit of the connecting pin, and when the distance between the movable part and the body decreases, the sphere does not affix the protruding unit of the connecting pin.

2. The pneumatic-fixation connecting device of claim 1, wherein the surface of the base connected to the protrusion ring comprises a plurality of indentations for accommodating the elastic units respectively.

3. The pneumatic-fixation connecting device of claim 1, wherein the connecting pin comprises at least one recess portion, the partial volume of the sphere enters the recess portion of the connecting pin via the through holes of the extension tube.

4. The pneumatic-fixation connecting device of claim 1, wherein a diameter of the through hole of the extension tube is smaller than a diameter of the sphere.

5. The pneumatic-fixation connecting device of claim 1, wherein the protrusion ring further comprises at least one cavity for accommodating the sphere.

6. The pneumatic-fixation connecting device of claim 1, wherein a notch is disposed on a surface of the body facing the movable part for accommodating the protrusion ring.

7. The pneumatic-fixation connecting device of claim 1, wherein corresponding threads are placed respectively at the placement hole of the body and the stop unit, the stop unit is disposed at the through holes via the thread and adjusts the length of the elastic unit via the threads.

8. The pneumatic-fixation connecting device of claim 7, wherein the stop unit can be separated from the placement hole of the body, and the elastic unit can be taken out from the placement hole.

9. The pneumatic-fixation connecting device of claim 1, comprising a pump and an air-pressure chamber, the pump being fluidly connected to the air-pressure chamber for changing the air pressure inside the air-pressure chamber, and the movable part being placed in the air-pressure chamber and being movable along an inner surface of the air-pressure chamber.

10. The pneumatic-fixation connecting device of claim 9, wherein the pump is used to increase the air pressure in the air-pressure chamber, and when the pressure force in the air-pressure chamber is larger than the elastic force of the elastic unit, the movable part moves towards a direction of the body and the distance between the movable part and the body reduces.

11. The pneumatic-fixation connecting device of claim 1, wherein the extension tube protrudes from the body and the plurality of through holes are disposed on the extension tube where it protrudes from the body.

* * * * *